US 12,083,886 B2

(12) United States Patent
Wall et al.

(10) Patent No.: US 12,083,886 B2
(45) Date of Patent: Sep. 10, 2024

(54) DISPLAY DEVICE, MOTOR VEHICLE HAVING A DISPLAY DEVICE, AND METHOD FOR OPERATING A DISPLAY DEVICE

(71) Applicant: AUDI AG, Ingolstadt (DE)

(72) Inventors: Christian Wall, Hitzhofen (DE); Michael Herter, Eichstaett (DE)

(73) Assignee: AUDI AG, Ingolstadt (DE)

( * ) Notice: Subject to any disclaimer, the term of this patent is extended or adjusted under 35 U.S.C. 154(b) by 200 days.

(21) Appl. No.: 17/794,696

(22) PCT Filed: Dec. 21, 2020

(86) PCT No.: PCT/EP2020/087419
§ 371 (c)(1),
(2) Date: Jul. 22, 2022

(87) PCT Pub. No.: WO2021/151593
PCT Pub. Date: Aug. 5, 2021

(65) Prior Publication Data
US 2023/0054576 A1 Feb. 23, 2023

(30) Foreign Application Priority Data
Jan. 27, 2020 (DE) .................. 10 2020 101 877.0

(51) Int. Cl.
B60K 35/20 (2024.01)
B60K 35/00 (2006.01)
(Continued)

(52) U.S. Cl.
CPC .......... B60K 35/00 (2013.01); B60R 11/0235 (2013.01); B60K 35/22 (2024.01);
(Continued)

(58) Field of Classification Search
USPC ........................................... 701/36
See application file for complete search history.

(56) References Cited

U.S. PATENT DOCUMENTS 8,860,656 B1 * 10/2014 Cho ................. G06F 1/1643
345/173
10,203,863 B2 * 2/2019 Kwon ................ G06F 1/1652
(Continued)

FOREIGN PATENT DOCUMENTS

DE 4128663 A1 8/1991
DE 10115050 A1 3/2001
(Continued)

OTHER PUBLICATIONS

International Search Report (Form PCT/ISA/210); mailed Apr. 8, 2021 in corresponding PCT Application No. PCT/EP/2020/087419 (4 pages) (2 pages English Translation).
(Continued)

Primary Examiner — Jonathan L Sample
(74) Attorney, Agent, or Firm — STAAS & HALSEY LLP

(57) ABSTRACT

A display device may include a flexible display surface element having a display surface, and an adjustment unit which includes a clamping element in form of a rod and arranged such that the rod moves in a first adjustment direction, a restoring element arranged on the clamping element, and a deflection element in form of a rod. A first side edge of the display surface element is arranged on a length of the clamping element. A second side edge of the display surface element opposite the first side edge is connected to the clamping element via the restoring element. A surface of the display surface element is bent and has a bending region. A length of the deflection element extends in same direction as the clamping element, the deflection element extends within the bending region of the bent display surface element and is arranged such that the deflection element moves in a second adjustment direction to
(Continued)

change a distance between the deflection element and the clamping element.

17 Claims, 5 Drawing Sheets

(51) Int. Cl.
*B60R 11/02* (2006.01)
*B60K 35/22* (2024.01)
*B60K 35/53* (2024.01)
*B60R 11/00* (2006.01)

(52) U.S. Cl.
CPC ............ *B60K 35/223* (2024.01); *B60K 35/53* (2024.01); *B60R 2011/0082* (2013.01); *B60R 2011/0084* (2013.01); *B60R 2011/0092* (2013.01)

(56) References Cited

U.S. PATENT DOCUMENTS

| | | | | |
|---|---|---|---|---|
| 10,757,823 | B2* | 8/2020 | Park | G06F 1/1626 |
| 10,929,002 | B2* | 2/2021 | Lee | G06F 3/04883 |
| 11,348,490 | B1* | 5/2022 | Kwak | G06F 3/0414 |
| 11,403,972 | B2* | 8/2022 | Park | G06F 1/1652 |
| 2005/0218706 | A1* | 10/2005 | Schikora | B64D 11/00153 |
| | | | | 297/188.17 |
| 2013/0265221 | A1* | 10/2013 | Lee | H04N 21/4222 |
| | | | | 345/156 |
| 2013/0275910 | A1* | 10/2013 | Kim | G06F 1/1652 |
| | | | | 715/800 |
| 2014/0218375 | A1* | 8/2014 | Kim | G06F 1/1643 |
| | | | | 345/501 |
| 2014/0375702 | A1* | 12/2014 | Cho | G06F 3/04886 |
| | | | | 345/102 |
| 2016/0266782 | A1* | 9/2016 | Rawlinson | G06F 3/04886 |
| 2017/0181304 | A1* | 6/2017 | Lee | H05K 7/005 |
| 2018/0260001 | A1* | 9/2018 | Klug | G02B 30/52 |
| 2020/0020255 | A1* | 1/2020 | Yoon | H05K 5/0017 |
| 2020/0022271 | A1* | 1/2020 | Park | G06F 1/1652 |
| 2021/0016720 | A1* | 1/2021 | Bai | F16M 11/18 |

FOREIGN PATENT DOCUMENTS

| | | |
|---|---|---|
| DE | 10 2005 038 485 A1 | 2/2007 |
| DE | 10 2016 221 254 B3 | 4/2018 |
| DE | 10 2020 101 877.0 | 1/2020 |
| EP | 1637387 A1 | 3/2006 |
| WO | WO 2009/095992 A1 | 8/2009 |
| WO | WO 2019/107909 A1 | 6/2019 |
| WO | PCT/EP2020/087419 | 12/2020 |

OTHER PUBLICATIONS

Written Opinion (Form PCT/ISA/237); mailed Aug. 5, 2021 in corresponding PCT Application No. PCT/EP/2020/087419 (6 pages) (6 pages English Translation).

Examination Report dated Dec. 4, 2020 in corresponding German Patent Application No. 10 2020 101 877.0 (4 pages).

Notification of Transmittal of Translation of the International Preliminary Report on Patentability (Form PCT/IB/338); mailed Aug. 11, 2022 in corresponding PCT Application No. PCT/EP2020/087419 (1 page).

International Preliminary Report on Patentability (Form PCT/IB/373); mailed Jul. 28, 2022 in corresponding PCT Application No. PCT/EP2020/087419 (1 page).

* cited by examiner

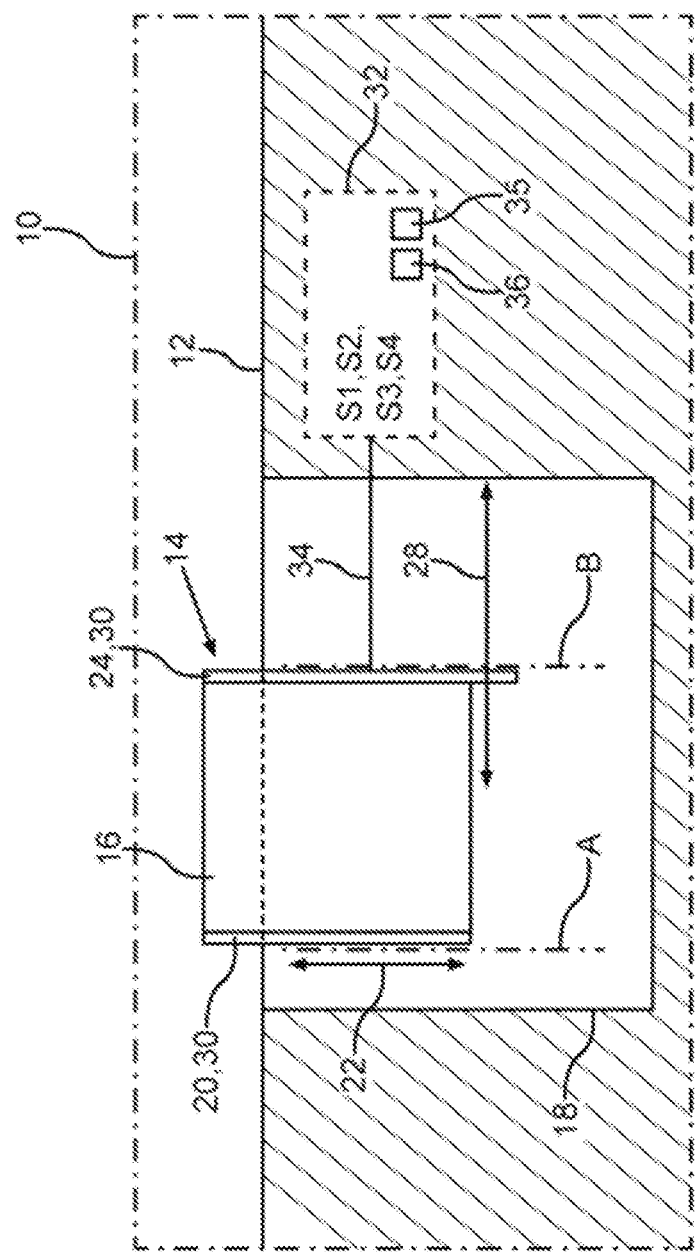

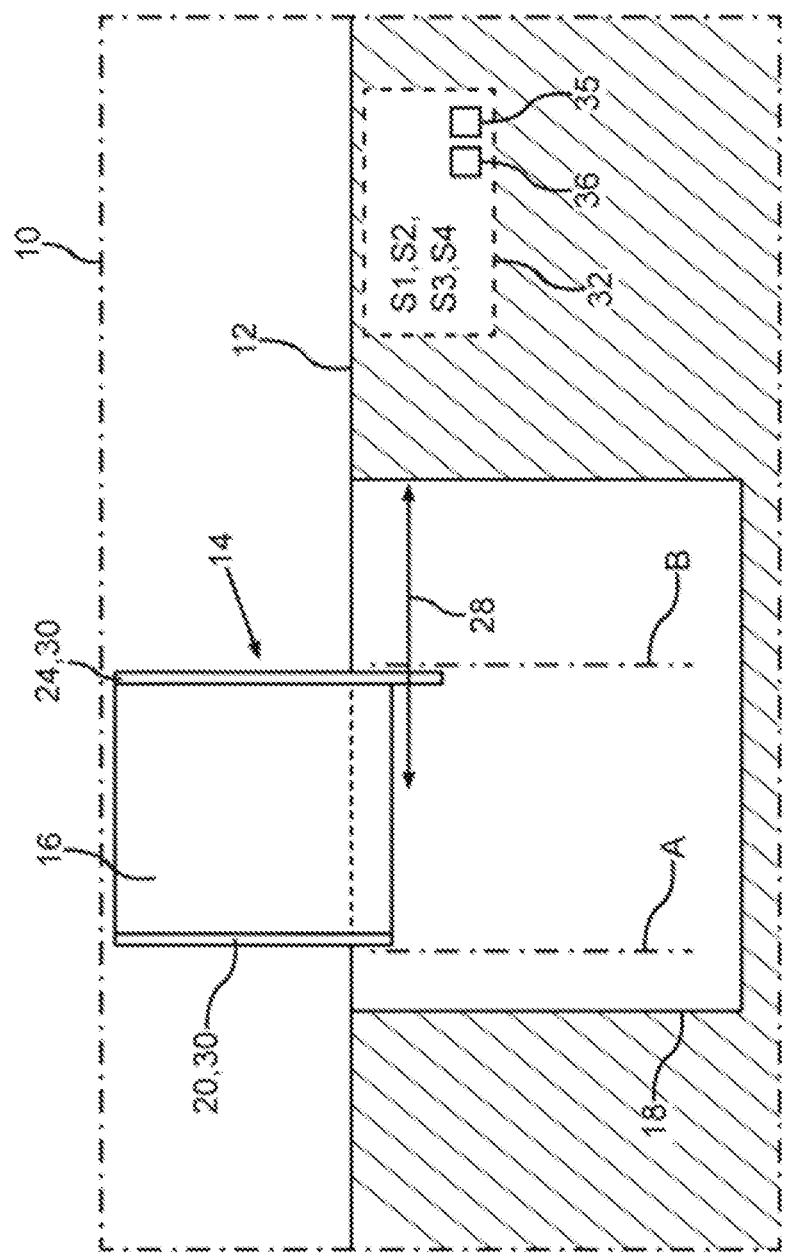

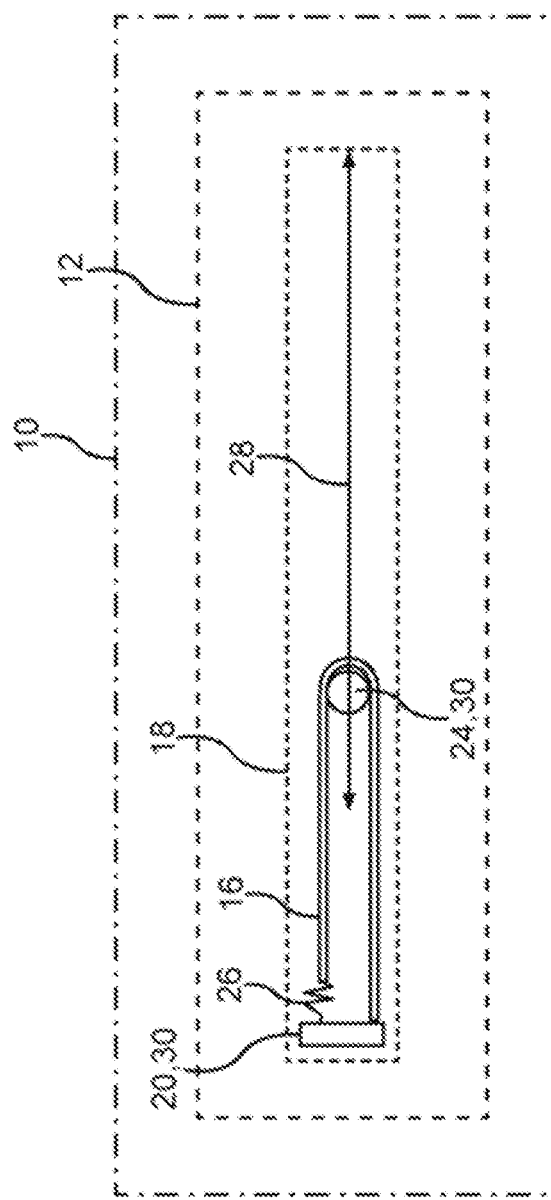

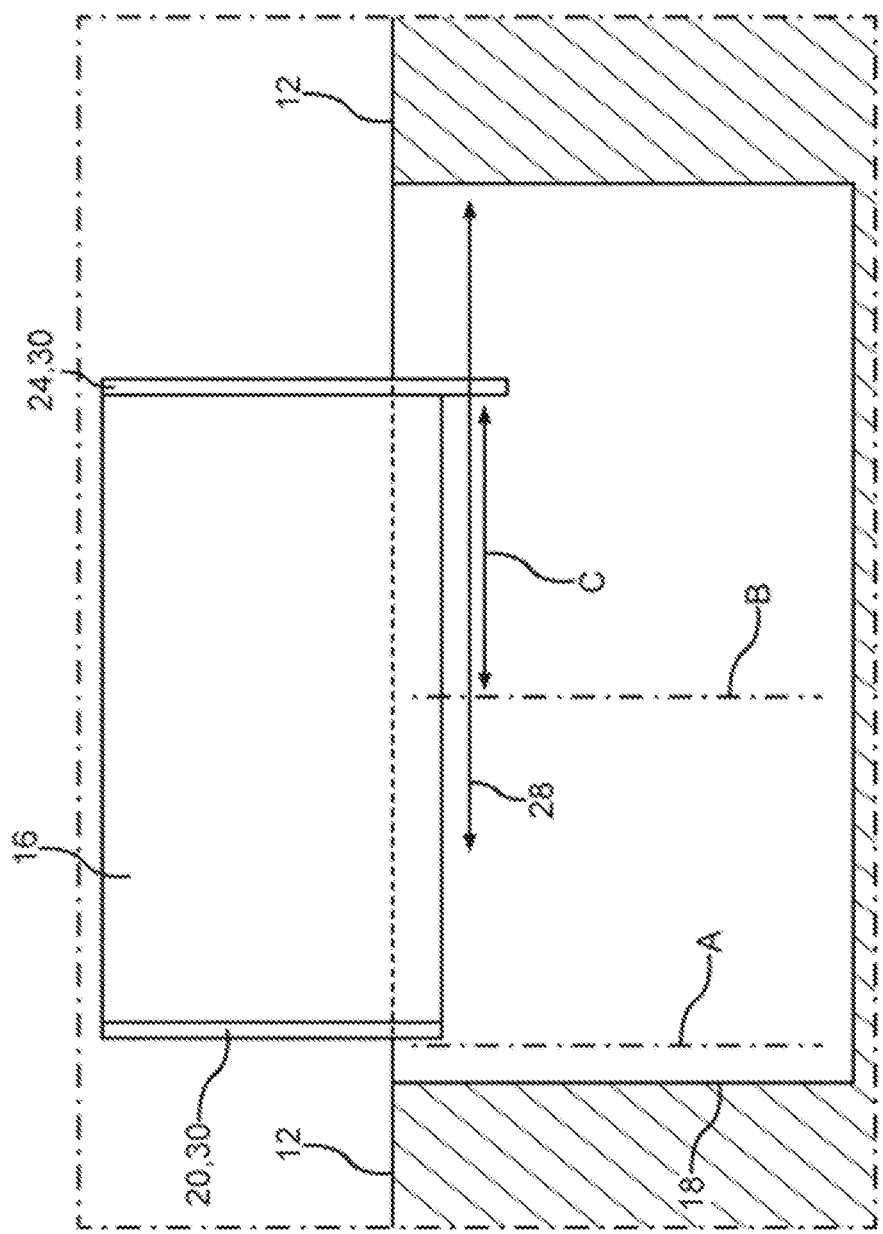

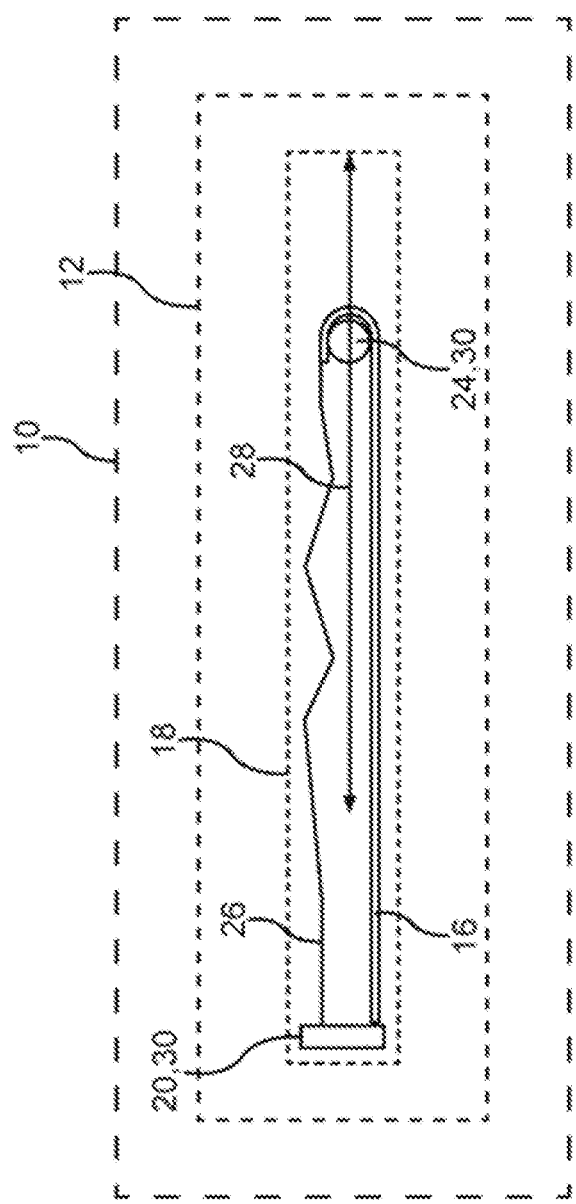

DISPLAY DEVICE, MOTOR VEHICLE HAVING A DISPLAY DEVICE, AND METHOD FOR OPERATING A DISPLAY DEVICE

CROSS-REFERENCE TO RELATED APPLICATIONS

This application is a U.S. national stage of International Application No. PCT/EP2020/008749, filed on Dec. 21, 2020. The International Application claims the priority benefit of German Application No. 10 2020 101877.0 filed on Jan. 27, 2020. Both the International Application and the German Application are incorporated by reference herein in their entirety.

FIELD

The present description relates to a display device, thus a device, a device component, or a group of devices to display content. The display device may include a flexible display surface element having a display surface for displaying the displayed content. The present description also relates to a motor vehicle having such a display device.

BACKGROUND

Displays are incorporated more and more in vehicles and are becoming design elements. There is the desire to provide the largest possible displays and to be able to vary them in size depending on an application, for example, during manual or piloted travel. Furthermore, there is the desire to produce displays in an attractive manner.

Above all, the installation space, but also laws, for example, restrict the possible size and position of permanently installed, rigid displays.

DE 101 15 050 A1 describes a display device, in particular for vehicles, which comprises a flat display screen and positioning means, by use of which the flat display screen is movable into a desired observation position.

DE 41 28 663 A1 describes a dashboard, which has a display screen for displaying items of information and a keypad for retrieving these items of information and for inputting data.

A display device for a vehicle is known from EP 1 637 387 A1, which comprises a display for displaying data of applications for a vehicle user, and pivot means for shifting the display between at least two positions.

The height of the display surfaces of the display devices from the related art is changed by extending or unrolling the display surfaces.

SUMMARY

Described may be a way of increasing a dynamic level in a size change of a display surface.

Described may be the concept of extending a display surface element, thus, for example, a display, not only in one direction and thus only increasing height of the display surface, but also enlarging the display surface in a second direction, namely in the width. For this purpose, a flexible display surface element may be used, for example, a flexible display, for example, a flexible OLED display screen. The flexibility of the display may be used for widening the display. A first kinematic mechanism may extend the display surface element, for example, the entire display, and thus may set the display height. The described display surface element is not rolled up in a starting position, thus in the position in which a smaller display surface is available than in a panorama position, but rather clamped or stretched by a second kinematic mechanism and a restoring element, for example a spring.

The display width can thus be adjusted. The described display device offers the possibility of adjusting the display surface size and the form factor freely between a minimum and a maximum size. This advantageously has the result that using a simple kinematic mechanism, various sizes of a display surface can be represented—thus set. Less installation space is required upon implementation of this principle.

A display device for a motor vehicle, includes a flexible display surface element having a display surface for displaying content. A flexible display surface element is understood as a component which is a display surface, which is not rigid, but rather movable, thus flexible and/or elastic and/or rollable and/or stretchable. The display surface element can be a display screen, for example, as a display screen having organic light-emitting diodes ("OLEDs").

The display device comprises an adjustment unit, which has or includes a clamping element, which is in form of a rod and arranged so the rod is movable in a first adjustment direction, a restoring element arranged on the clamping element, and a deflection element in form of a rod. The clamping element can be arranged so the clamping element is only movable in the first adjustment direction.

An adjustment unit is understood as a mechanical and/or electrical component group, which can execute directed movements, and which can also be referred to as a kinematic mechanism. The adjustment unit can have, for example, a cable pull, a Bowden cable, a hydraulic mechanism, a guide rail, and/or an electric motor for moving the clamping element and the deflection element.

A clamping element is understood as a component which fixes the display surface element, in which the display surface element can thus, for example, be pinched or clamped or adhesively bonded; and which contributes to the display surface element being tautly mounted. The clamping element can be pushed or pulled in the first adjustment direction, for example.

A restoring element is a component or a component group which is designed to exert a restoring force on the display surface element and can thus, for example, be or include a spring, a folded bellows, or an elastic band.

A first side edge of the display surface element may be arranged or mounted, for example, fastened, on a length of the clamping element. The first side edge can be arranged along the length of the clamping element. A second side edge of the display surface element opposite to the first side edge may be connected through the restoring element to the clamping element, so that a surface of the display surface element may be curved and forms a bending region. The bending region is that region in which the planar display surface element is turned, thus curved. The bending region is thus formed by the bent or smoothly turned display surface element, is thus the region where the surface of the display surface element forms a curve. The display surface element may be smoothly bent only once, and thus may not be rolled.

A length of the deflection element extends essentially in the same direction as the clamping element, preferably in the same direction. The length of the deflection element thus has the same orientation as the clamping element. The deflection element extends within the bending or "inner curve" of the curved display surface element and is arranged so the deflection element is movable in a second adjustment direction, so that the adjustment unit is designed to change a distance between the deflection element and the clamping element. The second adjustment direction preferably extends perpendicularly to the first adjustment direction. The deflection element can be, for example, pushed or pulled in the second adjustment direction.

The restoring element exerts a restoring force on the display surface element towards the clamping element. In the starting position, in which the clamping element and the deflection element are at a lesser distance to one another than in a panorama position, the display surface element is tensioned by the restoring element as in the panorama position. In both positions, a display content of the display surface element is thus well visible, since the display surface element is tensioned in both positions. In the panorama position, the width visible to an occupant of a motor vehicle, for example, is larger, however, also the height may be larger.

The above-mentioned advantages may result. The display surface element may be buckled or hardly folded or not at all, due to which the material may be protected and no wrinkles interfere in the display of the display content. The surface available for the display of content can be continuously adjusted in the surface size.

The second adjustment direction can extend perpendicularly to the first adjustment direction and/or perpendicularly to an extension of the length of the deflection element. In addition to a height, a width of the display surface and thus a panorama format can thus be set. Such a format is reasonable in particular in the motor vehicle, since the space above the control panel may be limited, for example, and since a panorama format may be very useful for films, for example.

The flexible display surface element can be curved smoothly around the deflection element only once. The display surface element is thus stretchable. In contrast to a rolled-up display surface element, this has the result that no drive may be necessary for rolling and unrolling the display surface element, so that no dirt is also rolled in on the display surface element and thus arrives at other points of the display surface element, and a probability that wrinkles arise when changing between starting position and panorama position may be significantly reduced.

The display device can include a control unit, which is to generate a control signal, which describes an adjustment of the clamping element in the first adjustment direction and an adjustment of the deflection element in the second adjustment direction, as a function of a set usage mode, for example, a usage mode of the display device. The generated control signal can indicate a simultaneous adjustment of clamping element and deflection element. Starting position and panorama position can thus be provided from application to application.

A control unit is understood as a device, a device group, or a device component which is configured to receive and evaluate signals, and to generate control signals. The control unit can be, for example, as a control chip or controller.

The generated control signal can describe a change between a starting position of the display surface element and a panorama position, in which a distance between the deflection element and the clamping element of the display surface element is larger than in the starting position. The set usage mode, thus a current usage mode or a usage mode selected by a user, can be a driving mode of a motor vehicle.

The described examples may include a motor vehicle which includes an example display device, according to examples. The above-described advantages may result. The motor vehicle according to the examples may be an automobile, in particular as a passenger vehicle or truck, or as a bus or motorcycle.

Display surface element and adjustment unit can be at least partially arranged in a shaft of an interior trim element of a motor vehicle in the starting position, thus at least partially lowered into the shaft. The clamping element and the deflection element can each extend vertically or essentially vertically, thus extend essentially along a motor vehicle vertical axis. In the event of a change between the starting position and a panorama position, the control unit can cause the adjustment unit to move the clamping element vertically and the deflection element horizontally.

An interior trim element is understood here as an element of the interior trim of the motor vehicle. The interior trim element can be a control panel, a hood, or a dashboard of the motor vehicle.

The described examples, while achieving the above-mentioned advantages, may be by a method for operating an example of a display device, according to examples, for example, a display device of the motor vehicle according to the examples, wherein the control unit:

establishes a set usage mode, for example, a set usage mode of the motor vehicle, in particular a current driving mode or a driving mode selected by the user; and in dependence on a set usage mode, generates a control signal, which indicates an adjustment of the clamping element in the first adjustment direction and an adjustment of the deflection element in the second adjustment direction; for example, a simultaneous adjustment of clamping element and deflection element.

In one example of the method, the display device can be a display device of a motor vehicle, wherein the set usage mode is a set driving mode; wherein the control unit sets the panorama position of the display surface element in a piloted driving mode. The display surface can be set as needed depending on the driving mode. In a piloted journey, in which the display device also assumes high importance in entertainment, a particularly large surface can thus be provided for a film, for example. In a manual or partially automated journey, a smaller display surface can be set, on which, for example, the important travel data can be displayed and as much view as possible through the windshield is enabled.

The examples also include the control unit for the motor vehicle, which is configured for carrying out the method according to the examples. The control unit can be, for example, as a control chip or controller. The control unit may have a processor unit which is configured to carry out a method according to the examples. The processor unit can have for this purpose at least one microprocessor and/or at least one microcontroller and/or at least one FPGA (field programmable gate array) and/or at least one DSP (digital signal processor). Furthermore, the processor unit can have program code which is configured, upon execution by the processor unit, to carry out the example of the method. The program code can be stored in a data memory of the processor unit.

The examples also include refinements of the motor vehicle according to the examples, the method according to the examples, and the control unit according to the examples which may have features as have already been described in conjunction with the refinements of the display device according to the examples. For this reason, the corresponding refinements of the motor vehicle according to the examples, the method according to the examples, and the control unit according to the examples are not described once again here.

The examples also include the combinations of the features of the described examples.

BRIEF DESCRIPTION OF THE DRAWINGS

These and other aspects and advantages will become more apparent and more readily appreciated from the following description of the example embodiments, taken in conjunction with the accompanying drawings of which:

FIG. 1 shows a schematic illustration of an exemplary embodiment of the devices and a method, wherein the display surface element is in the starting position;

FIG. 2 shows a further schematic illustration of the exemplary embodiment, having the display surface element in the starting position;

FIG. 3 shows a schematic illustration of the exemplary embodiment in a top view having the display surface element in the starting position;

FIG. 4 shows a further schematic illustration of the exemplary embodiment, having the display surface element in the panorama position; and FIG. 5 shows a further schematic illustration of the exemplary embodiment in a top view having the display surface element in the panorama position.

DETAILED DESCRIPTION

The embodiments explained hereinafter are examples of an invention. In the examples, the described components of the examples each represent individual features that may be considered independently of one another, which each also refine the examples independently of one another. The disclosure is therefore also to include combinations of the features of the examples other than those shown. Furthermore, the described examples can also be supplemented by further features of the examples already described. In the figures, identical reference numerals may each identify functionally identical elements.

FIG. 1 schematically illustrates the principle of the devices according to the an example and a method on basis of a first example. For this purpose, FIG. 1 schematically shows a view into a cockpit of a motor vehicle 10, for example, a bus or a passenger vehicle.

In a top view, FIG. 1 schematically shows an interior trim element 12, which can be in particular a dashboard or a control panel, alternatively, for example, a center console or armrest. The display device 14 shown in FIG. 1 is shown by way of example in a rest position, in which the display surface element 16 can be at least partially retracted into a shaft 18 of the interior trim element 12, wherein, for example, the upper fourth or the upper third of the display surface element 16 can protrude out and can thus be visible. If the display device 14 is not used, the display surface element 16 can thus be lowered completely into the shaft 18, for example.

In one variant, the display surface element 16 can be set in the starting position or clamping position to the width of the shaft 18. For widening in the horizontal, second adjustment direction 28, for example, the display surface element 16 can then first be moved completely out of the shaft 18, and then the deflection element 24 can be adjusted along the motor vehicle transverse axis, thus in the second adjustment direction 28. Alternatively, as shown here in the figures, the shaft can be sufficiently wide that the display surface element 16 also fits in the panorama position with respect to the width. The lines A and B highlight the width of the display surface element 16 in the clamping position.

In the starting position, which can also be referred to as the clamping position, a width visible by the user can be set to the width of the shaft or less.

The display surface element 16 can be, for example, a display screen having organic light-emitting diodes (OLEDs). Suitable flexible displays are known to a person skilled in the art from the related art. In the top view of FIG. 1, the display surface element can be connected, for example, on the driver side to a clamping element 20, for example, adhesively bonded, clamped, or pinched thereon, wherein the clamping element 20 can be in form of a rod and can be moved, for example, via a guide rail (not shown in FIG. 1) in the first adjustment direction 22, thus along the motor vehicle vertical axis. For this purpose, the clamping element 20 can have, for example, a clamp, a fixed bearing, or a mechanism for clamping the display surface element 16. The display surface element 16 may be fixed on the clamping element 20.

The display surface element 16 is curved or wound once around a rod-shaped deflection element 24 in the example of FIG. 1, for example, only laid smoothly once around the deflection element 24. The deflection element 24 can be, for example, a rod made of metal or plastic, which can be in form of a roller having, for example, a radius of 10 mm. The side edge of the display surface element 16 opposite to the side edge fixed on the clamping element 20 is connected to the clamping element 20 via (through) a restoring element 26. Due to better clarity of FIG. 1, the restoring element 26 is not shown in FIG. 1 (or in FIG. 2 and FIG. 4).

To illustrate the arrangement of the opposite side edge on the clamping element 20, FIG. 3 shows a top view in which the restoring element 26 can be, for example, as a spring, elastic band, or folded bellows. The restoring element 26 is thus a yielding element for tensioning the display surface element 16, which holds the display surface element 16 under tension. The restoring element 26 can thus also be referred to as a "spring element".

FIG. 3 shows the flexible display surface element 16 in its pre-tensioned or restored state, and in the course of the second adjustment direction 28. As illustrated in FIG. 1 and FIG. 2, this second adjustment direction 28 can extend perpendicularly to the first adjustment direction 22, thus along a motor vehicle width. In a variation of the display device 14 shown in the figures, the arrangement of the clamping element 20 and the deflection element 24 can also be mirrored, thus, for example, the clamping element 20 can be arranged on the front passenger side from the display surface element 16 and the deflection element 24 can be arranged on the driver side thereof.

The clamping element 20 and the deflection element 24 can be part of an adjustment unit 30. In summary, the adjustment unit 30 can have two linear drives in which a height is set by moving the clamping element 20, and a width by moving the deflection element 24. In FIG. 1 and FIG. 2, first the movement of the clamping element 20 and thus the setting of the height is shown. Optionally, the deflection element 24 can also be pushed upward during the movement of the clamping element 20.

FIG. 2 shows the display device 14 at a point in time where the display surface element 16 is extended still further. An optional control unit 32, for example, a controller of the motor vehicle 10 or a control chip of the display device 14, can control the adjustment unit 30. A data communication link 34 is shown schematically for this purpose, which can be, for example, a wireless data communication link, for example, a WLAN connection, or, for example, a data bus of the motor vehicle 10. The data communication link 34 is schematically shown only to the deflection element 24, but can be connected, for example, to a central chip of the adjustment unit 30, which can then control the linear kinematic mechanism of clamping element 20 and deflection element 24. For this purpose, the adjustment unit 30 can have, for example, an electric motor. The optional control unit 32 can have, for example, a processor unit 35, and/or a data memory 36, on which, for example, a program code for carrying out the method according to the described examples can be stored.

If the setting of the display surface element 16 takes place in dependence on a current driving mode of the motor vehicle 10, the control unit 32 can thus receive a corresponding signal from, for example, a driver assistance system of the motor vehicle 10 (method S1) and evaluate the corresponding signal, and, for example, upon establishing a piloted driving mode (S2), generate a control signal for operating the kinematic mechanism (S3). The control unit 32 can then transmit the generated control signal to the adjustment unit 30 (S4). In a manual driving mode, for example, the starting position can then be set again, in which the display surface element 16 can display, for example, travel data, for example, a velocity, a speedometer reading, and a tank fill level (cf. FIG. 1).

FIG. 4 shows a view into the cockpit, wherein the display surface element 16 is already located in the panorama position. FIG. 4 shows the kinematic mechanism during the widening of the display surface element 16 in the direction of a Y axis, thus along a motor vehicle transverse axis or the second adjustment direction 28, into the panorama position, which can also be referred to as the tensioning position. For reasons of better clarity, the control unit 32 is not shown in FIG. 4, but can be provided in the embodiment as shown in FIG. 1 and FIG. 2. Double arrow C shows the widening in comparison to the starting position (clamping position).

In the panorama position, the display surface element 16 can have, for example, a width ratio of 16:9. This format can also be maintained in the starting position by the combination of the height and width adjustment. In other words, the visible region of the display surface element 16 can be dynamically enlarged and shrunk.

FIG. 5 illustrates by way of the top view that the left side of the display surface element 16 remains fixed on the clamping element 20 during the stretching, and in which, for example, a roller-like movement of the deflection element 24 of the display surface element 16 is stretched and the restoring element 26 is pulled in the length.

The display surface element 16 is thus under higher tension and, if the deflection element 24 is moved toward the clamping element 20 again, is pulled by the restoring element 26 toward the clamping element 20.

Overall, the examples show how a display which can be enlarged and/or shrunk can be provided by the examples.

In a further example, a use of a display surface element 16, for example, a display, is provided, which may be enlarged and/or shrunk arbitrarily both in the height and also in the width. An extension kinematic mechanism is used here, for example, for the enlargement in the height and a flexible display having a corresponding kinematic mechanism and restoring mechanism is used for the widening.

The flexible exemplary display is fixedly clamped on one side, for example, and the other side of the display can be hung and tensioned, for example, on the same clamping element 20, for example, a clamping part, by, for example, a spring as the restoring element 26.

Especially for the widening, for example, a simple deflection roller as the deflection element 24, a restoring element 26, for example, a restoring unit, and the flexibility of the exemplary display are used.

In this case, the system can be continuously retracted and extended up to the maximum size and also widened and each format can be set freely.

This also advantageously has the result that various display sizes can be represented. The kinematic mechanism used is simple.

A description has been provided with particular reference to preferred embodiments thereof and examples, but it will be understood that variations and modifications can be effected within the spirit and scope of the claims which may include the phrase "at least one of A, B and C" as an alternative expression that refers to one or more of A, B or C may be used, contrary to the holding in *Superguide v. DIRECTV*, 358 F3d 870, 69 USPQ2d 1865 (Fed. Cir. 2004).

The invention claimed is:

1. A display device, comprising:
    a flexible display surface element having a display surface to display content; and
    an adjustment unit, which includes,
        a clamping element formed as rod and arranged so the rod is movable in a first adjustment direction,
        a restoring element arranged on the clamping element, and
        a deflection element in form of a rod,
    a first side edge of the flexible display surface element is arranged on a length of the clamping element,
    a second side edge of the flexible display surface element opposite to the first side edge is connected through the restoring element to the clamping element, so that the display surface of the flexible display surface element is curved and has a bending region, and
    a length of the deflection element extends in a same direction as the clamping element, the deflection element extends within the bending region of the curved display surface element and is arranged to be movable in a second adjustment direction to change a distance between the deflection element and the clamping element.

2. The display device as claimed in claim 1, wherein the second adjustment direction extends perpendicularly to the first adjustment direction and/or perpendicularly to an extension of the length of the deflection element.

3. The display device as claimed in claim 1, wherein the flexible display surface element is curved smoothly when around the deflection element.

4. The display device as claimed in claim 1, further comprising:
    a controller to generate, in dependence on a set usage mode, a control signal which indicates an adjustment, from among adjustments, of the clamping element in the first adjustment direction and of the deflection element in the second adjustment direction.

5. The display device as claimed in claim 4, wherein the adjustment, from among the adjustments, is a simultaneous adjustment of the clamping element and the deflection element.

6. The display device as claimed in claim 4, wherein the generated control signal describes a change between a starting position of the flexible display surface element and a panorama position, in which a distance between the deflection element and the clamping element of the flexible display surface element is greater than in the starting position.

7. The display device as claimed in claim 4, wherein the set usage mode is a driving mode of a motor vehicle.

8. A motor vehicle, comprising:
a flexible display surface element having a display surface to display content; and
an adjustment unit, which includes,
a clamping element formed as rod and arranged so the rod is movable in a first adjustment direction,
a restoring element arranged on the clamping element, and
a deflection element in form of a rod;
a first side edge of the flexible display surface element is arranged on a length of the clamping element,
a second side edge of the flexible display surface element opposite to the first side edge is connected through the restoring element to the clamping element, so that the display surface of the flexible display surface element is curved and has a bending region, and
a length of the deflection element extends in a same direction as the clamping element, the deflection element extends within the bending region of the curved display surface element and is arranged to be movable in a second adjustment direction to change a distance between the deflection element and the clamping element.

9. The motor vehicle as claimed in claim 8,
wherein the flexible display surface element and the adjustment unit are arranged in a starting position at least partially in a shaft of an interior trim element of the motor vehicle, so that the clamping element and the deflection element each extend vertically; and
wherein in an event of a change between the starting position and a panorama position, a controller causes the adjustment unit to move the clamping element vertically and the deflection element horizontally.

10. The motor vehicle as claimed in claim 8, wherein the second adjustment direction extends perpendicularly to the first adjustment direction and/or perpendicularly to an extension of the length of the deflection element.

11. The motor vehicle as claimed in claim 8, wherein the flexible display surface element is curved smoothly when around the deflection element.

12. The motor vehicle as claimed in claim 8, further comprising:
a controller to generate, in dependence on a set usage mode, a control signal which indicates an adjustment, from among adjustments, of the clamping element in the first adjustment direction and of the deflection element in the second adjustment direction.

13. The motor vehicle as claimed in claim 12, wherein the adjustment, from among the adjustments, is a simultaneous adjustment of the clamping element and the deflection element.

14. The motor vehicle as claimed in claim 13, wherein the set usage mode is a driving mode of a motor vehicle.

15. A method of operating a display device, the display device including a flexible display surface element having a display surface to display content; and
an adjustment unit, which includes,
a clamping element formed as rod and arranged so the rod is movable in a first adjustment direction,
a restoring element arranged on the clamping element, and
a deflection element in form of a rod;
a first side edge of the flexible display surface element is arranged on a length of the clamping element,
a second side edge of the flexible display surface element opposite to the first side edge is connected through the restoring element to the clamping element, so that display surface of the flexible display surface element is curved and has a bending region, and
a length of the deflection element extends in a same direction as the clamping element, the deflection element extends within the bending region of the curved display surface element and is arranged to be movable in a second adjustment direction to change a distance between the deflection element and the clamping element, the method comprising:
by a controller,
establishing a set usage mode, and
in dependence on the set usage mode, generating a control signal, which indicates an adjustment of the clamping element in the first adjustment direction and an adjustment of the deflection element in the second adjustment direction.

16. The method as claimed in claim 15,
wherein the set usage mode is a set driving mode; and
wherein the controller sets a panorama position of the flexible display surface element in a piloted driving mode.

17. The display device as claimed in claim 1, further comprising:
a controller to communicatively link through a data communication link with a controller of a motor vehicle, to receive a control signal, generated in dependence on a set usage mode, which indicates an adjustment, from among adjustments, of the clamping element in the first adjustment direction and the deflection element in the second adjustment direction, according to a usage mode.

* * * * *